United States Patent
Erban et al.

(10) Patent No.: US 7,248,956 B2
(45) Date of Patent: Jul. 24, 2007

(54) ADAPTATION OF A VEHICLE STABILIZING SYSTEM TO THE SURFACE

(75) Inventors: Andreas Erban, Loechgau (DE); Martin Kieren, Schwieberdingen (DE); Andreas Schumann, Sindelfingen (DE); Alexander Reckefuss, Ludwigsburg (DE); Antonio Mallol Torralbo, Ludwigsburg (DE); Christian Reiner, Pleidelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 169 days.

(21) Appl. No.: 11/054,907

(22) Filed: Feb. 9, 2005

(65) Prior Publication Data
US 2005/0222717 A1    Oct. 6, 2005

(30) Foreign Application Priority Data
Mar. 30, 2004    (DE) .................. 10 2004 015 311

(51) Int. Cl.
  *B60G 21/00*    (2006.01)
  *G06F 7/00*    (2006.01)
(52) U.S. Cl. ...................................... 701/48
(58) Field of Classification Search .................. None
  See application file for complete search history.

(56) References Cited

U.S. PATENT DOCUMENTS

| | | | |
|---|---|---|---|
| 4,749,210 A * | 6/1988 | Sugasawa ............... 280/5.519 |
| 5,253,931 A | 10/1993 | Köster et al. |
| 5,269,557 A * | 12/1993 | Butsuen et al. .......... 280/5.515 |
| 6,062,336 A | 5/2000 | Amberkar et al. |
| 6,312,066 B1 | 11/2001 | Gronau et al. |
| 6,807,473 B1 * | 10/2004 | Tran ........................... 701/80 |
| 7,073,622 B2 * | 7/2006 | Turner et al. ................ 180/446 |
| 2003/0200016 A1 * | 10/2003 | Spillane et al. ................ 701/36 |
| 2005/0004732 A1 * | 1/2005 | Berry et al. ................... 701/48 |

FOREIGN PATENT DOCUMENTS

| | | |
|---|---|---|
| EP | 0 323 066 | 2/1993 |
| EP | 0 425 810 | 9/1993 |
| GB | 2 357 159 | 6/2001 |

* cited by examiner

Primary Examiner—Michael J. Zanelli
(74) Attorney, Agent, or Firm—Kenyon & Kenyon LLP

(57) ABSTRACT

A vehicle stabilizing system, for motor vehicles in particular, includes a control unit in which a stabilization control algorithm is stored, a sensor system for detecting present actual values of vehicle state variables, and at least one actuator for implementing a stabilizing intervention when an unstable situation is detected. In order to be able to adapt the vehicle stabilizing system to different types of surfaces, a device is provided which supplies the control unit with information concerning the nature of the surface and at least one controller variable of the stabilization control algorithm is changed as a function of the supplied surface information.

11 Claims, 1 Drawing Sheet

ADAPTATION OF A VEHICLE STABILIZING SYSTEM TO THE SURFACE

FIELD OF THE INVENTION

The present invention relates to a vehicle stabilizing system, for motor vehicles in particular, and a method for vehicle stabilization.

BACKGROUND INFORMATION

Vehicle stabilizing systems (VSS) primarily include the anti-lock system (ALS), traction control system (TCS), or electronic stability program (ESP) and are used to improve the controllability of motor vehicles in critical driving situations, e.g., for oversteering when negotiating turns, and to stabilize the vehicle. In addition to the named systems, the term "vehicle stabilizing system" is also understood to include stabilizing functions such as, for example, active front steering (AFS), other vehicle stabilizing systems such as active spring-and-shock-absorber systems (vertical force distribution systems), the known supplemental functions of ESP such as, for example, the rollover mitigation (ROM) function, active cruise control (ACC), and principally all regulating systems that may intervene actively in vehicle operation to stabilize the vehicle.

Such vehicle stabilizing systems have the objective of adapting the handling properties of a vehicle by operating various actuators such as the brakes, the engine torque, or the steering to the driver's intent and simultaneously stabilizing the vehicle while taking into consideration the driving conditions (roadway condition, speed, etc.).

As part of the vehicle dynamics control system, these systems detect various state variables such as a setpoint yaw rate, a setpoint attitude angle, a setpoint slip, or various other controlled variables and calculate a necessary stabilizing intervention from the system deviation such as a wheel-individual braking torque or drive torque. The calculated values are implemented using the corresponding actuators and finally influence the handling properties of the vehicle.

Known vehicle stabilizing systems are customarily very robust with respect to the surface, i.e., designed for a large range of different roadway or off-road conditions.

However in off-road driving in particular, such as climbing in a streambed or driving in deep sand, the vehicle behaves entirely differently than when driving on asphalt, so that even in non-critical driving situations, stabilizing interventions may occur which are not desirable under the special conditions. In the same manner, driving situations may also occur in which the vehicle stabilizing system intervenes too little or too late in the vehicle operation.

SUMMARY OF THE INVENTION

An object of the present invention is therefore to adapt a vehicle stabilizing system to the present nature of the surface or of the terrain and to optimize the handling properties of the vehicle, i.e., the function of the VSS.

This object is achieved according to the present invention.

An important aspect of the present invention is that information concerning the nature of the surface is supplied to the vehicle stabilizing system (VSS) and the control response of the stabilizing system is adapted to the nature of the surface by setting at least one controller variable of a stabilization-control algorithm as a function of the supplied surface information. This has the important advantage that it is possible to adapt the stabilizing system to various types of surfaces such as mud, sand, asphalt, etc. and optimize the control response.

The term "controller variable" is understood here to be a random variable which is used in a control algorithm and by which it is possible to influence the control response, as well as information from which it is possible to derive such a variable. The controller variable may be, for example, a setpoint variable such as a setpoint yaw rate or a setpoint slip, a controller amplification, a control threshold, i.e., a variable determining the sensitivity of the regulation, a manipulated variable such as a braking pressure or a random actuator activation value, a parameter such as the characteristic speed, or any other variable which is significant for the regulation.

According to a preferred embodiment of the present invention, a yaw rate controller, a traction controller and/or a vehicle speed or acceleration controller of the stabilizing system may be adapted to the present nature of the surface. In addition to the aforementioned control algorithms, any other stabilization control algorithms such as ROM, ACC, AFS, etc. may be adapted to the nature of the surface and optimized.

The information concerning the nature of the surface may be generated and supplied by different systems. A sensor system may be provided to detect the nature of the surface. The corresponding sensor information is preferably fed to the control unit of the vehicle stabilizing system which then appropriately adapts at least one controller variable.

A surface mode selection device such as a simple selector switch may also be provided, which the driver may use to set a specific surface type. The set surface mode may also be fed to the control unit of the vehicle stabilizing system which then appropriately adapts at least one controller variable.

The number of possible controller variable settings in a specific control algorithm, e.g., a traction controller, is preferably limited to a few settings. This means that the control algorithm has, for example, the same setting in a first surface mode as in another surface mode. The variety of surface modes offered by the selection device results from a suitable combination of the settings available in the control algorithm. As a result, it is possible to reduce the complexity of the individual control algorithms without limiting the variety of functions of the total system.

In such a surface mode selection device, an operating error may easily make it possible for the set surface mode (e.g., sand, mud, asphalt) to deviate from the actual nature of the surface. For the sake of safety, it is therefore recommended to allow the control response to be adapted only under predetermined conditions, such as within a predetermined speed range, a predetermined transverse acceleration range, or within the limits of one or a plurality of other driving state variables which are of relevance to driving safety. If the predetermined ranges or limits are exceeded, the vehicle stabilizing system is preferably automatically set to a safe mode (standard mode), which of the selectable modes (e.g., sand, mud, asphalt, etc.) offers high driving safety in particular. The ranges or limits may also be a function of the surface mode.

Severe limits (e.g., for the vehicle speed) were predetermined above for the activation/deactivation of the surface mode selection system and the changed controller variables were reset to standard values if the limits were exceeded. Optionally, the changed controller variables may also be reset to a standard value "gradually" via a predetermined range of a driving state variable. To this end, characteristics may be provided that specify how the controller variables are to be reset ("blending"), for example.

According to a preferred embodiment of the present invention, a change in the control response is allowed only if the vehicle stabilizing system (VSS) is not active. This in particular prevents the control response from being changed in an already critical driving situation and negatively influencing the vehicle stabilization.

Moreover, a controller variable is preferably not changed abruptly but gradually. To this end, a "fadeover" function, for example, may be provided via which the controller variable is guided to the new value of the controller variable. This fadeover function calculates, for example, a plurality of intermediate values based on an interpolation principle, the intermediate values being considered in succession. As a result, the regulation operates substantially more smoothly.

If the VSS reports a fault condition which arose, for example, due to a sensor error or a transient undervoltage, the change in a controller variable is preferably also not allowed and the corresponding algorithm is preferably switched to a safe mode (e.g., the standard mode). This measure in turn contributes to an avoidance of incorrect settings and accordingly to an increase in driving safety.

If the vehicle has other systems besides VSS which influence the handling properties such as an adaptive (speed-dependent) ride height regulation, the information concerning the nature of the surface or a control signal derived from it is preferably also supplied to these systems, via which these systems may also be adapted to the particular surface. In the case of an adaptive ride height regulation, the vehicle chassis may be automatically set higher when traveling on sand, for example, than when traveling on asphalt.

Known vehicle stabilizing systems such as ESP or TCS customarily also include a driver-operable on/off switch by which it is possible to activate or deactivate the particular function. Whether an activation or deactivation is allowed is customarily a function of one or a plurality of additional conditions such as the vehicle speed or the transverse acceleration of the vehicle. This is intended to prevent the driver from deactivating the corresponding safety functions in potentially dangerous driving states such as at high speeds. In addition, it is known to reactivate a deactivated stabilizing function automatically if predetermined limit values are exceeded in order to be able to intervene in possible critical driving states.

According to the present invention, preferably one or a plurality of activation and/or deactivation conditions are set as a function of the information concerning the nature of the surface. This makes it possible, for example, for the vehicle stabilizing system to be deactivated on sand only up to lower speeds than when driving, for example, on asphalt. In the deactivated state, the parameters of the stabilization control algorithm are preferably set according to a standard mode.

In order to implement an error management, the present status of the vehicle stabilizing system (VSS), for example, may be fed to the surface mode selection device. The status signal may, for example, include information concerning the surface mode, which was just set by the VSS control unit, as well as error information. The selection device is thus able to recognize the mode in which the VSS is presently functioning and, if necessary, the modes into which it is presently possible to switch the selection device. If the VSS control unit reports an error, requests by the selection device are preferably ignored and all regulation systems are set to a standard mode.

In addition, the status signal may also contain information concerning whether the VSS control unit is presently in run-up (initialization phase).

In addition, the VSS control unit also preferably transfers to the surface mode selection device information concerning other surface modes into which a switch may be made (mode availability information).

The present invention is described in greater detail below as an example with reference to the appended drawing:

DETAILED DESCRIPTION

Figure 1:
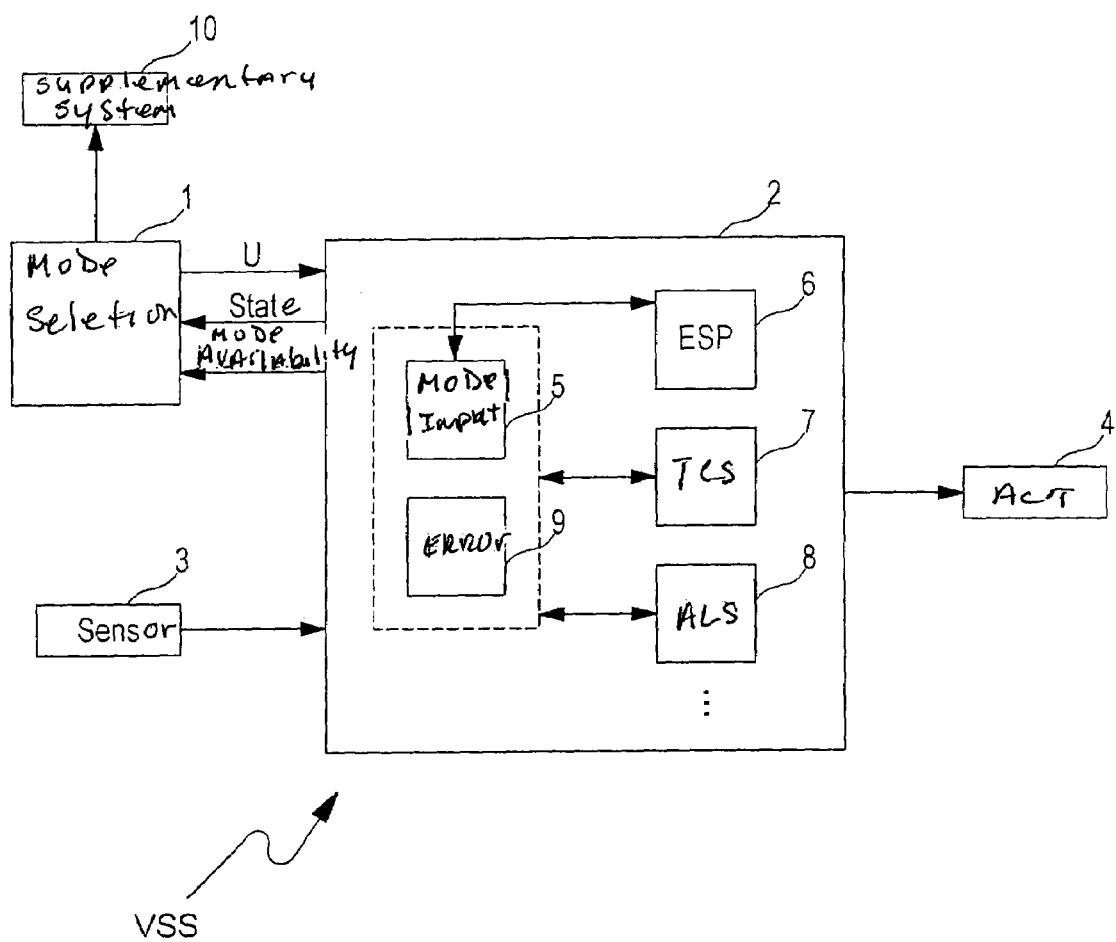
FIG. 1 shows a vehicle stabilizing system for stabilizing a vehicle in critical driving situations, according to the present invention.

As shown in FIG. 1, vehicle stabilizing system VSS essentially includes a control unit 2 in which various stabilization control algorithms 6, 7, 8 are stored, a sensor system 3 for detecting present actual values of driving state variables (e.g., wheel speeds, steering wheel angle, braking pressure, yaw rate, etc.), and various actuators 4 such as wheel brakes, an engine control unit, etc. for implementing a stabilizing intervention when an unstable driving situation is detected. For the sake of clarity, the sensors and actuators of system VSS are each combined in a block 3 and 4, respectively.

Stabilizing system VSS here includes control algorithms ESP 6, TCS 7, and ALS 8, each of which may include one or a plurality of control functions. Algorithm ESP 6 may contain, for example, a rollover mitigation (ROM), a steering angle control (e.g., AFS), or another known supplemental control function which is based, for example, on a yaw rate control. In addition to aforementioned stabilization control algorithms 6, 7, 8, other control algorithms (not shown) may also be stored in control unit 2, which may intervene in the vehicle operation in critical driving situations.

Stabilizing system VSS further includes a surface mode selection device 1, which may, for example, have a selector switch which the driver may use to select the nature of the surface. Possible settings are, for example:

Standard
Grass, snow, ice
Mud, track grooves
Sand
Streambed climbing
Sport
Error The surface mode selected by the driver is transmitted to control unit 2 via a signal U.

In control unit 2, information U concerning the nature of the surface is first read in and processed by a mode input logic 5. One or a plurality of stabilization control algorithms 6, 7, 8 (and additional stabilization algorithms if necessary) are finally adapted to the set surface mode.

To this end, at least one controller variable of stabilization control algorithms 6, 7, 8 is modified as a function of surface information U. The "controller variable" may be a random variable which is used in a control algorithm and by which it is possible to influence the control response, or information from which it is possible to derive such a variable. The controller variable may be, for example, a setpoint variable such as a setpoint yaw rate or a setpoint slip, a controller amplification, a control threshold, i.e., a variable determining the sensitivity of the regulation, a manipulated variable such as a braking pressure, a parameter, or any other variable which is significant for the regulation.

Vehicle stabilizing system VSS may be adapted to the particular surface mode in a different manner. Only some of the adaptation possibilities are shown as examples below, the basic aspects being likewise applicable to other stabilization algorithms.

1. Adaptation of the Vehicle Dynamics Control System (ESP)

The function of the vehicle dynamics control system is essentially based on a yaw rate regulation of a yaw rate controller, which specifies setpoints for a secondary slip controller in the form of setpoint slip. The slip controller is customarily activated when the system deviation of yaw rate $d\Psi_{actual}/dt - d\Psi_{setpoint}/dt$ exceeds a predetermined threshold value (the control threshold) and thus:

$$d\Psi_{actual}/dt - d\Psi_{setpoint}/dt > \text{control threshold}_0$$

In particular when driving on a soft surface, e.g., mud or sand, substantially greater system deviations may occur than in standard situations on an asphalt roadway. This may result in undesired corrections of the yaw rate controller and corresponding braking interventions at the wheels of the vehicle.

In order to avoid such corrections, the control threshold for driving on a soft surface is raised. In this case the following applies to the control threshold:

$$\text{control threshold} = K1 * \text{control threshold}_0$$

K1 is an elevation factor and "control threshold$_0$" is the control threshold in a standard mode, e.g., on asphalt.

In order not to endanger driving safety with an incorrect setting of surface mode selection device 1, the control threshold is preferably adapted to the surface mode only in "safe" vehicle operation. This may be defined, for example, by specifying a maximum speed and/or a maximum transverse acceleration or another vehicle dynamics variable. Outside of the range, the control threshold is preferably reset to the standard value control threshold$_0$.

The above applies to a float angle regulation in the same manner.

The control threshold may also be set differently for understeering and oversteering situations. For example:

$$\text{control threshold}_{under} = K2 * \text{control threshold}_{under}^0$$

$$\text{control threshold}_{over} = K3 * \text{control threshold}_{over}^0$$

where K2, K3>1.

Vehicle dynamics control system 6 customarily also includes a differential braking torque controller which limits the differential braking torque of two opposite wheels of one axle to a maximum value. The differential braking torque controller is ordinarily inactive if the differential braking torque is smaller in amount than a "dead zone" where:

$$|\text{differential braking torque}| < \text{dead zone}_0$$

If a soft surface is set, such as mud or sand, the dead zone is further expanded to avoid undesirable braking interventions. In this case:

$$\text{dead zone} = K4 * \text{dead zone}_0$$

K4 being a multiplication factor dependent on the surface mode.

In addition to the aforementioned adaptations, the traction controller of system 6 may also be adapted to the surface mode. It is known to lower the maximum allowable drive slip for severe understeering or oversteering of the vehicle in order to keep the lateral traction of the wheels as high as possible. The drive slip reduction is customarily a function of an oversteering and understeering indicator and additional parameters if necessary.

According to the related art, the oversteering and understeering indicator is formed as a function of setpoint yaw rate $d\Psi_{setpoint}/dt$, of actual yaw rate $d\Psi_{actual}/dt$ and of yaw rate deviation $d\Psi_{actual}/dt - d\Psi_{setpoint}/dt$, where:

$$\text{indicator}_0 = K5_0 * f(d\Psi_{setpoint}/dt, d\Psi_{actual}/dt, (d\Psi_{actual}/dt - d\Psi_{setpoint}/dt))$$

Amplification factor $K5_0$ may, for example, be changed as a function of the surface mode and accordingly the extent of the drive slip reduction may be set, where:

$$K5 = K5_0 f(U)$$

f(U) being a function dependent on the surface mode. The stability indicator may also be changed as a function of other driving state variables, in particular vehicle speed v or transverse acceleration $a_y$, where, for example:

$$\text{indicator} = f(v) * f(a_y) * f(U) * \text{indicator}_0$$

The amplification here is a function of speed and transverse acceleration and may, e.g., be depicted and implemented using characteristics.

2. Adaptation of the Traction Control System (TCS)

As a function of the surface, it may be practical to allow more or less traction slip in order to achieve an optimum acceleration response. Setpoint slip $\lambda_{setpoint}$, which is set by the controller, is therefore modified as a function of the surface, where:

$$\lambda_{setpoint} = \lambda_{setpoint_0} * K6,$$

$\lambda_{setpoint_0}$ being a standard setpoint slip and K6 being a surface-dependent factor. Factor K6 is also preferably speed-dependent and may also be a function of a stability indicator.

A precondition for manipulating setpoint slip $\lambda_{setpoint}$ is adequate vehicle stability. If the vehicle is in an unstable state, the setpoint slip is preferably set back to a safe value $\lambda_{setpoint_0}$. The limit values, e.g., for vehicle speed v, a transverse acceleration $a_y$ or another stability indicator, which indicate an instability, are also preferably a function of the surface mode. As a result, the vehicle transverse dynamics may be adapted to different off-road and surface requirements.

TCS system 7 customarily also includes a cardan controller, via which the engine torque is regulated. In order to adapt the cardan controller to different types of surfaces, the controller amplification, for example, may be changed. This makes it possible, for example, to reach a predetermined setpoint slip $\lambda_{setpoint}$ significantly faster in an off-road mode than in the standard mode, making it possible to achieve an improved acceleration response.

System 7 TCS customarily also includes a differential speed controller (braking torque controller), which intervenes in the vehicle operation if the differential speed of the driven wheels exceeds a maximum value, i.e., the actual wheel speed of a driven wheel deviates too greatly from the setpoint wheel speed calculated from the setpoint slip specification and thus:

$$\Delta v > \text{threshold}_0$$

$\Delta v$ being the system deviation of the wheel speed. The intervention threshold of the braking torque regulation may in turn be adapted to various surface properties. Thus:

$$\text{threshold} = f(U) * \text{threshold}_0$$

This expansion of the control threshold may in particular prevent a forward travel-inhibiting control intervention of the braking torque or drive torque regulation on a loose surface (mud, sand) and optimize forward travel with respect to comfort and traction.

In addition, the controller amplification of the braking torque regulation may be set as a function of the surface mode. In crawl travel through a streambed or driving over rocky, very uneven terrain, the wheels are often lifted off or their load is greatly reduced. Due to the reduction or lack of vertical forces, these wheels are accelerated very rapidly. It is therefore practical to slow down the affected wheel more rapidly by a comparatively more rapid buildup of braking torque at the wheel in question.

It is therefore provided to adapt the controller amplification to the set surface mode. This makes it possible to substantially accelerate the buildup of braking torque in specific surface modes.

3. Adaptation of a Controller to the Delay Support

In extreme downhill driving, the use of a supplemental controller is known which makes it possible to reduce the vehicle speed to a maximum value (target speed) by automatic braking interventions. With a very rough surface such as when driving downhill on rocky terrain, this maximum speed should be lower than, for example, when driving downhill on an asphalt road. At least one of the following parameters of the supplemental controller is therefore adapted to the set surface mode:

Target speed=$K8$*target speed$_0$

Maximum delay=$K9$*maximum delay$_0$ $d\text{Delay}/dt = K10 * d\text{Delay}_0/dt$ In this connection, factors $K8$, $K9$, and $K10$ are a function of the surface mode.

LIST OF REFERENCE SYMBOLS

1 Surface mode selection device
2 Control unit
3 Sensor system
4 Actuators
5 Mode input device
6 Vehicle dynamics control system (ESP)
7 Traction control system (TCS)
8 Braking torque control system (ALS)
9 Error monitoring
10 Additional external vehicle systems
U Surface information
Stat Present status
ModVerf Mode availability

What is claimed is:

1. A vehicle stabilizing system comprising:
a control unit for storing a stabilization control algorithm;
a sensor system for detecting present actual values of driving state variables;
at least one actuator for implementing a stabilizing intervention when an unstable driving situation is detected; and
a device for supplying information concerning the nature of a driving surface to the control unit,
wherein the control unit sets at least one controller variable of the stabilization control algorithm as a function of the information supplied, and wherein the stabilization control algorithm is adapted only if the vehicle stabilizing system is not active and no stabilizing intervention is immediately imminent.

2. The vehicle stabilizing system according to claim 1, wherein the stabilizing system is for a motor vehicle.

3. The vehicle stabilizing system according to claim 1, wherein the controller variable is at least one of a setpoint variable, a manipulated variable, a controller amplification, a control threshold, a variable determining a sensitivity of a regulation, a controller parameter, and another variable influencing a control response.

4. The vehicle stabilizing system according to claim 1, wherein the stabilization control algorithm includes at least one of a yaw rate controller, a traction controller, a vehicle speed controller, a roll dynamics controller, a steering angle controller, and another control system capable of intervening in a vehicle operation to stabilize the vehicle.

5. The vehicle stabilizing system according to claim 1, further comprising a surface mode selection device for allowing a driver to specify a surface mode.

6. The vehicle stabilizing system according to claim 5, wherein the control unit transfers at least one of a present surface mode and error information to the surface mode selection device via a status signal.

7. The vehicle stabilizing system according to claim 5, wherein the control unit transfers information concerning a mode change availability to the surface mode selection device via a signal.

8. The vehicle stabilizing system according to claim 1, wherein a change in the controller variable is made gradually based on a change in the surface information.

9. The vehicle stabilizing system according to claim 1, wherein no change in the controller variable is allowed in the event of an error in the stabilization control algorithm.

10. The vehicle stabilizing system according to claim 1, wherein a condition which determines whether the vehicle stabilizing system can be switched into one of a passive and an active state is a function of the information concerning the nature of the surface.

11. A method for stabilizing a vehicle using a vehicle stabilizing system, the method comprising:
storing a stabilization control algorithm in a control unit;
using a sensor system, detecting present actual values of driving state variables;
using at least one actuator, implementing a stabilizing intervention when an unstable situation is detected;
supplying information concerning the nature of a driving surface to the control unit; and
varying at least one controller variable of the stabilization control algorithm as a function of the supplied information in order to adapt the vehicle stabilizing system to the driving surface, wherein the stabilization control algorithm is adapted only if the vehicle stabilizing system is not active and no stabilizing intervention is immediately imminent.

* * * * *